J. P. SMITH.
Corn Sheller.
No. 13,922.
Patented Dec. 11, 1855.
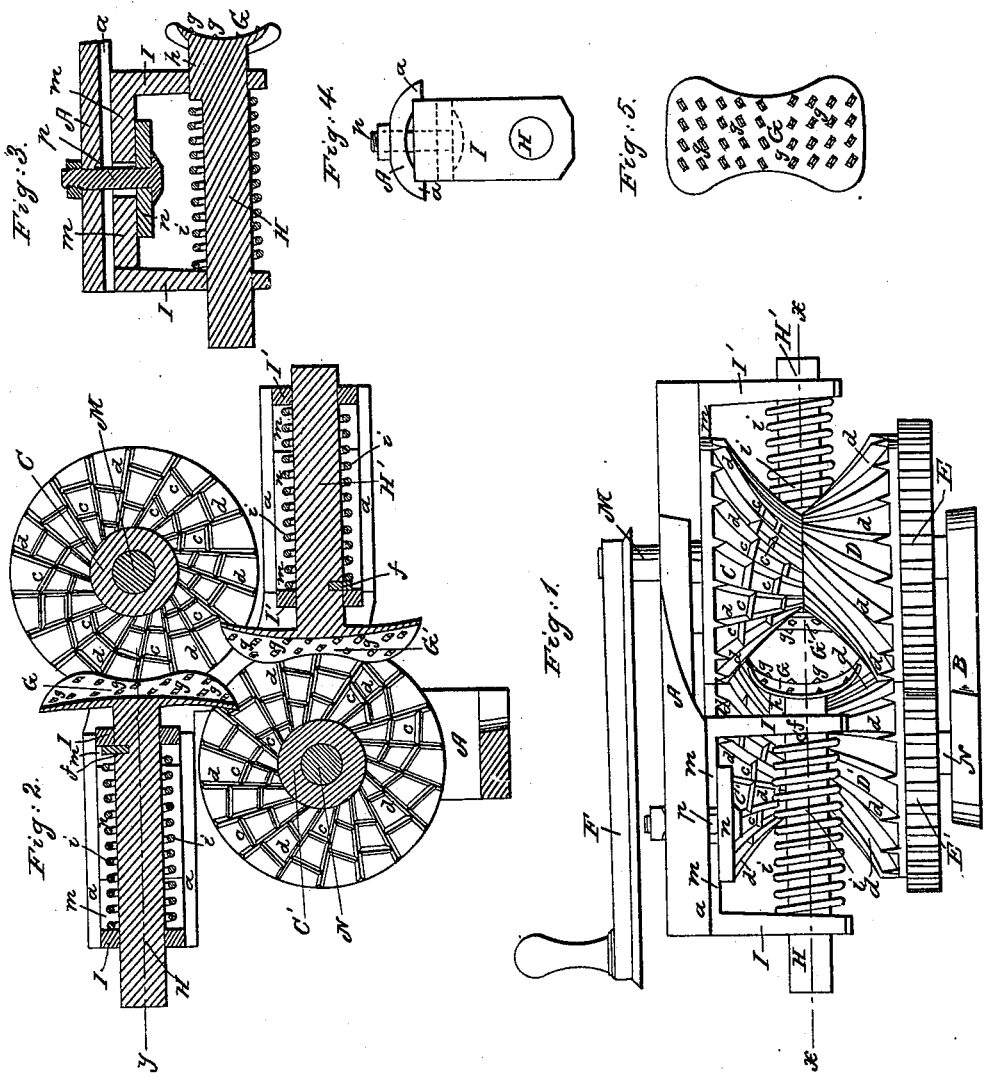

UNITED STATES PATENT OFFICE.

JEREMIAH P. SMITH, OF HUMMELSTOWN, PENNSYLVANIA.

CORN-SHELLER.

Specification of Letters Patent No. 13,922, dated December 11, 1855.

*To all whom it may concern:*

Be it known that I, JEREMIAH P. SMITH, of Hummelstown, in the county of Dauphin and State of Pennsylvania, have invented a new and Improved Corn-Sheller; and I do hereby declare that the following is a full and exact description thereof, reference being had to the accompanying drawings, making part of this specification, Figure 1 being a plan of the corn sheller; Fig. 2, a vertical section thereof in the plane $x\ x$, Fig. 1; Fig. 3, a section in the plane $y$, Fig. 2; Figs. 4 and 5, views of parts detached.

Like letters designate corresponding parts in all the figures.

All the principal parts of the machine are cast, then put together without any subsequent fitting, in the simplest manner; particular attention being paid to facility and cheapness of construction. The only frame work required, consists of two side plates A and B, a cross-piece, extending from the bottom of one, to the other, and secured thereto by a single bolt. Two shafts M, and N, are mounted in these plates, the former being provided with a winch F, (Fig. 1,) and situated obliquely above the other, substantially as shown in the drawings. A pair of truncated cones, or frustums, C, D, and C', D', each slightly concave from end to end, is placed respectively on each of these shafts, with their narrow ends, or bases together, as represented. One of each pair, as D, D', is provided with a cogwheel, or series of cogs cast thereon, the two gearing together, as seen at E, E'. All the frustums are provided with thin, or knife-edge projections, $d, d$, extending from end to end, around their entire peripheries, about a sufficient distance apart, just to freely receive the grains of corn between them. The direction of these projections should not be in planes parellel with the axes of the frustums, but a little winding, and all in the same direction, as shown in the drawings. The object of this arrangement of blade-like projections, is to enter between the grains of corn, so as to more easily separate them from the cobs, their winding or spiral position also serving to give a slight turning motion to the ears of corn, while passing down through the machine. One of each pair of frustums, as C, C', is also provided with little transverse projections $c, c$, extending across the space between the long projections $d, d$, not precisely at right angles thereto, but a little inclined, all in one direction, as represented; also to assist in giving the proper turning motion to the ears of corn. These cross projections have a tendency to enter between the rows, and generally to roughen the surface of the frustums, more suitably for disengaging the grain from the cobs.

Horizontally opposite each pair of frustums is situated a stationary concave G and G', just sufficient space being left between them and the frustums to allow the ears of corn to pass down, and be completely shelled. They are provided with shanks H, H', which slide in bearings I, I', and are surrounded with coiled springs $i, i'$, to enable the concaves to yield and adapt themselves to the different sizes of the ears of corn; the distance being limited however within suitable bounds by stops $f\ f$. The shape of these concaves is peculiar, being such as to adapt them most effectually to their situation and purpose. They are curved backward vertically from their respective frustums, at top and bottom, as shown in Fig. 2; concave horizontally, as most clearly seen in Fig. 1; and broader at top and bottom, where they occupy a wider space, than in the middle, where the space they occupy is more contracted, as represented in Fig. 5. With this construction of the concaves, the ears of corn are easily fed into the machine and cannot possibly escape, or turn from their proper direction. Small projections $g, g$, are formed on the faces of the concaves, in the manner represented in the drawings, for the purpose of taking hold of the ears of corn, so that they may not be driven down too easily through the machine. The concave G, is placed opposite and obliquely above the other concave G'; so that one side of each ear of corn is brought against the former, and then the other side against the latter. A wing or projection $h$, is cast, or formed, on one side of each shank H, H', and fits in a corresponding notch cast, or formed, in one of the bearings H', in order to prevent the concaves turning out of their proper positions.

The bearings I, I, and I', I', are each provided with a foot, or flanch, $m$, which fits between two lips $a, a$, formed in the plate A, as shown most clearly in Fig. 4; and each pair of flanches reach toward each other, leaving just space enough between, to insert a bolt *p*, which when tightly screwed up, presses a fastening plate *n*, against them, both bearings being thus secured by a single bolt.

What I claim as my invention and desire to secure by Letters Patent, is—

The construction of the frustums D and C, with thin, winding wings *d*, *d*, upon both, and cross projections *c*, *c*, upon one, substantially in the manner and for the purposes herein set forth.

The above specification of my improved corn-sheller signed by me this 29th day of August, 1855.

JEREMIAH P. SMITH.

Witnesses:
J. S. BROWN,
G. A. C. SMITH.